(12) United States Patent
Lee et al.

(10) Patent No.: US 10,118,319 B2
(45) Date of Patent: Nov. 6, 2018

(54) METHOD FOR FORMING FILM

(71) Applicant: SCIENBIZIP CONSULTING (SHENZHEN) CO., LTD., Shen Zhen (CN)

(72) Inventors: Han-Lung Lee, New Taipei (TW);
Hung-Chun Ma, New Taipei (TW);
Yu-Lin Liao, New Taipei (TW);
Chih-Jung Chang, New Taipei (TW)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 0 days.

(21) Appl. No.: 15/854,710

(22) Filed: Dec. 26, 2017

(65) Prior Publication Data

US 2018/0117799 A1    May 3, 2018

Related U.S. Application Data

(62) Division of application No. 14/832,589, filed on Aug. 21, 2015, now Pat. No. 9,889,582.

(30) Foreign Application Priority Data

Apr. 17, 2015   (TW) .............................. 104112489 A

(51) Int. Cl.
*B29C 35/08* (2006.01)
*B29C 37/00* (2006.01)
*B29C 33/00* (2006.01)

(52) U.S. Cl.
CPC ...... *B29C 35/0805* (2013.01); *B29C 37/0032* (2013.01); *B29C 2033/0005* (2013.01); *B29C 2035/0827* (2013.01); *B29C 2037/0035* (2013.01); *B29K 2995/0027* (2013.01)

(58) Field of Classification Search
CPC ............ B29C 35/0888; B29C 35/0805; B29C 37/0032
USPC .......................................................... 264/447
See application file for complete search history.

(56) References Cited

U.S. PATENT DOCUMENTS

| | | | | |
|---|---|---|---|---|
| 4,477,328 A | * | 10/1984 | Broeksema | ......... B29C 35/0888 522/181 |
| 5,628,944 A | * | 5/1997 | Nagasaka | ............. B29B 7/7663 264/102 |
| 2008/0111284 A1 | * | 5/2008 | Yoo | ........................ B29C 33/68 264/447 |
| 2009/0025630 A1 | * | 1/2009 | Murota | ............... B29C 35/0805 118/50 |
| 2010/0015271 A1 | * | 1/2010 | Yang | ................... B29C 35/0888 425/174.4 |

* cited by examiner

*Primary Examiner* — Matthew J Daniels
*Assistant Examiner* — Hana C Page
(74) *Attorney, Agent, or Firm* — ScienBiziP, P.C.

(57) ABSTRACT

A mold assembly for forming a film includes a transparent bottom mold, a top mold, a case, and a lighting member. The transparent bottom mold defines a cavity for receiving a workpiece and a plurality of liquid compositions. The top mold is matched with the bottom mold to accommodate the workpiece between the bottom mold and the top mold. The case receives the bottom mold and the top mold placed therein. Air in the case is exhausted from the case to coat the plurality of liquid composition on the workpiece. The lighting member emits light on the liquid compositions to solidify the liquid compositions to form a film on the workpiece.

7 Claims, 4 Drawing Sheets

METHOD FOR FORMING FILM

CROSS-REFERENCE TO RELATED APPLICATIONS

This is a divisional application of patent application Ser. No. 14/832,589, filed on Aug. 21, 2015, entitled "MOLD FOR FORMING FILM AND METHOD FOR FORMING FILM", assigned to the same assignee, which is based on and claims priority to Taiwan Patent Application No. 104112489 filed on Apr. 17, 2015, the contents of which are incorporated by reference herein.

FIELD

The subject matter herein generally relates to a mold and a method for forming a film.

BACKGROUND

Screens of electronic devices often need to be protected from being broken. A protecting film is usually coated on the screen by plating. However, the plated film is often non-uniformed.

BRIEF DESCRIPTION OF THE DRAWINGS

Implementations of the present technology will now be described, by way of example only, with reference to the attached figures.

DETAILED DESCRIPTION OF EMBODIMENTS

Figure 1:
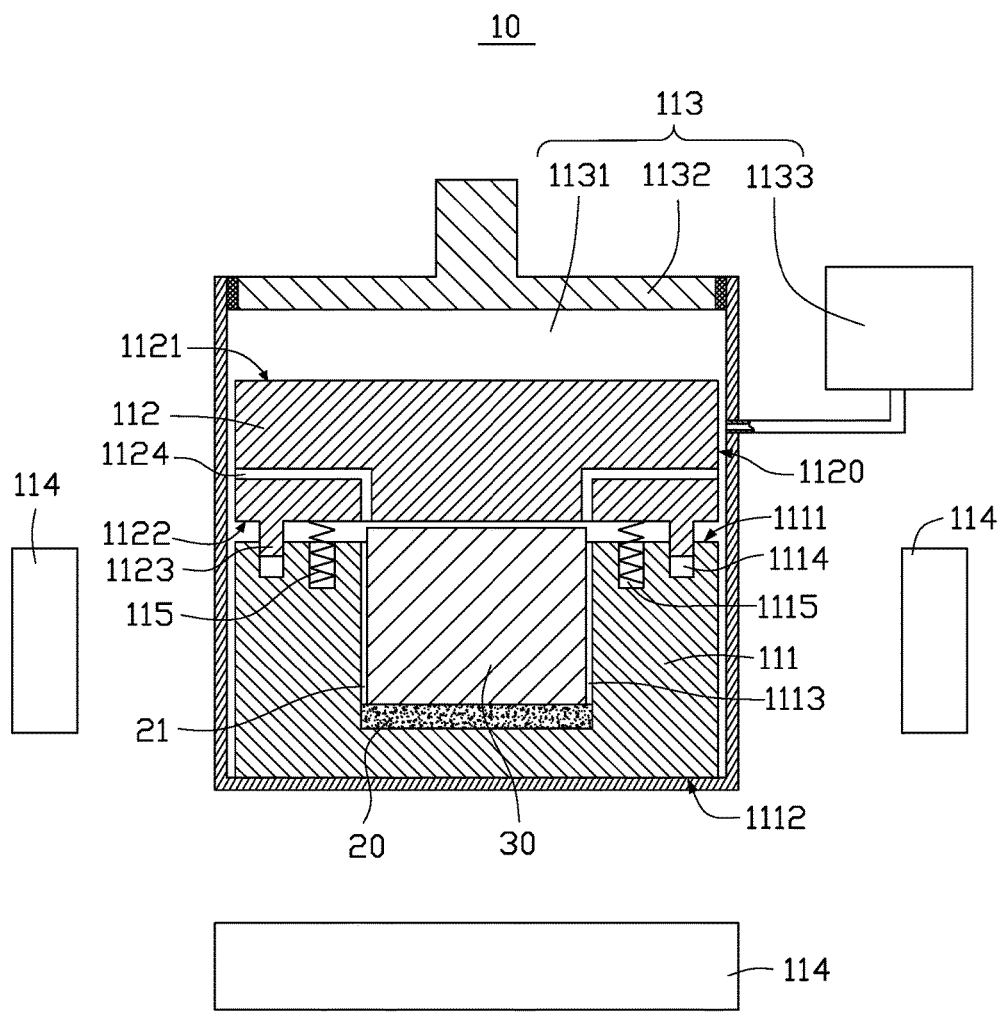
FIG. 1 is a cross sectional view of one embodiment of a mold for forming a film.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Figure 2:
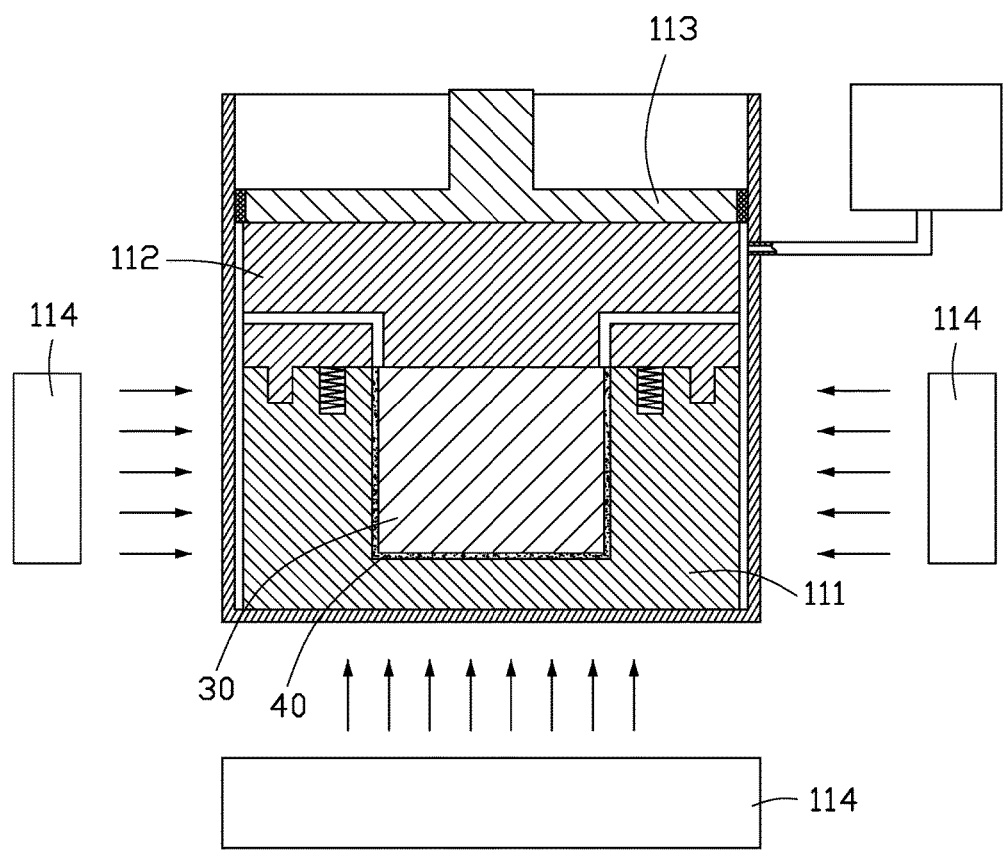
FIG. 2 is another cross sectional view of the mold of FIG. 1.
Figure 3:
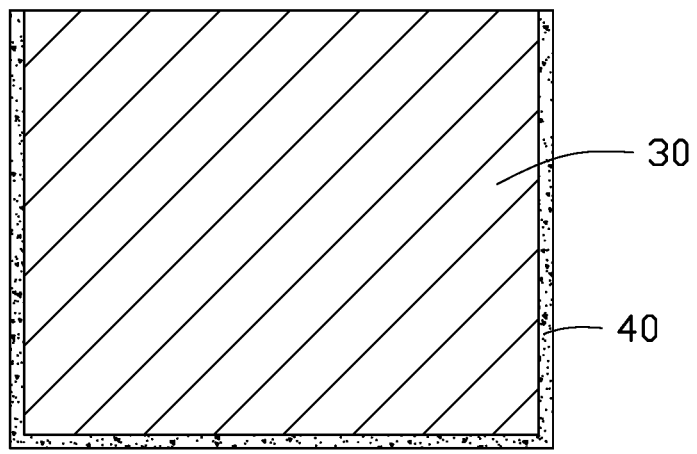
FIG. 3 is a cross sectional view of a film formed by the mold of FIG. 1 and a workpiece.
Figure 4:
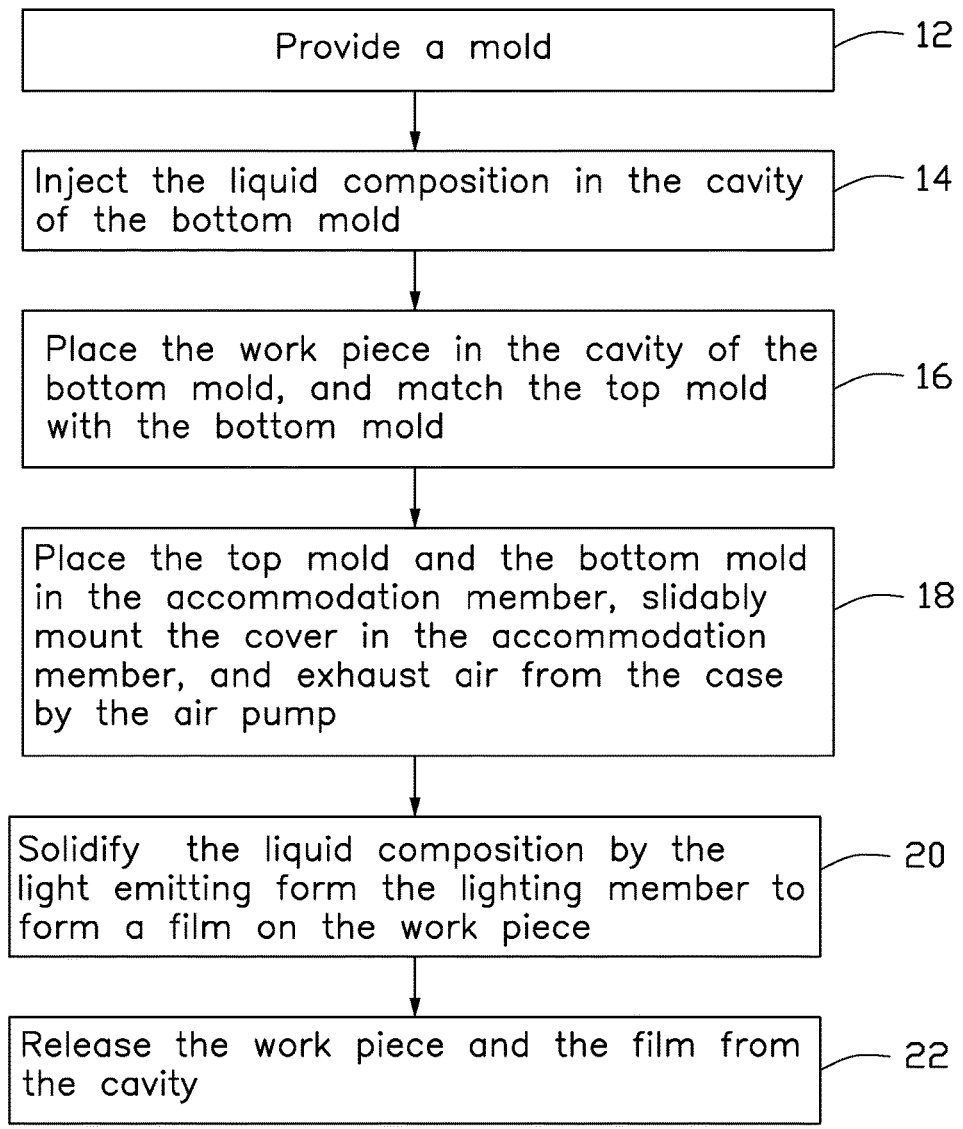
FIG. 4 is a flow chart of a method for forming a film.

Referring to FIGS. 1 to 3, a mold 10 for forming a film includes a bottom mold 111, a top mold 112, a case 113, a lighting member 114, and a plurality of elastic supporting members 15.

The bottom mold 111 is made of transparent material, and light (such as ultraviolet light) emitting from the lighting member 114 can be irradiated in the bottom mold 111. The bottom mold 111 includes a top surface 1111 and a bottom surface 1112. The bottom mold 111 defines a cavity 1113 sunk from the top surface 1111. The cavity 1113 is used to receive a workpiece 30 which is needed to form a film thereon. A size of the cavity 1113 is litter larger than that of the workpiece 30. In event that the workpiece 30 is placed in the cavity 1113, there is a gap defined between the workpiece 30 and an inner wall of the cavity 1113. The film is formed in the gap. The bottom mold 111 further defines a plurality of positioning holes 1114 and a plurality of receiving holes 1115.

In another embodiment, a release layer (not shown in the figures) can be formed on the inner wall of the cavity 1113, and the release layer can be used to release the workpiece 30 from the cavity 1113 after the film is formed on the workpiece 30.

In another embodiment, the bottom mold 111 can define more than one cavity 1113. Therefore, more than one workpieces 30 can be attached with a film at one time in the bottom mold 111.

The top mold 112 is used to match with the bottom mold 111. The top mold 112 includes a top wall 1121, a bottom wall 1122, and a side wall 1120 connected between the top wall 1121 and the bottom wall 1122. The bottom wall 1122 faces to the top surface 1111 of the bottom mold 111 and can be placed on the top surface 1111. A plurality of positioning pillars 1123 is protruded on the bottom wall 1122 corresponding to the plurality of positioning holes 1114 of the bottom mold 111. At least one air hole 1124 is defined in the top mold 112. The air hole 1124 extends from the side wall 1120 to the bottom wall 1122, and is aligned to the gap formed between workpiece 30 and an inner wall of the cavity 1113 when the top mold 112 is matched with the bottom mold 111.

The plurality of elastic supporting members 15 is placed in the plurality of receiving holes 1115. The plurality of elastic supporting members 15 can be sandwiched between the bottom wall 1122 of the top mold 112 and the top surface 1111 of the bottom mold 111. The elastic supporting members 15 can be elastic springs or plates. In another embodiment, the plurality of elastic supporting members 15 can be mounted on the bottom wall 1122 of the top mold 112.

The case 113 includes an accommodation member 1131, a cover 1132, and air pump 1133. The accommodation member 1131 is hollow and defines an opening. The top mold 112 and the bottom mold 111 can be placed in the accommodation member 1131. The cover 1132 can be slidably moved in the accommodation member 1131 and is sealed with an inner side of the accommodation member 1131. The case 113 is transparent and light (such as ultraviolet light) emitting from the lighting member 114 can be irradiated in the case 113. The air pump 1133 is used to exhaust air from the case 113.

The lighting member 114 can emit light to solidify a liquid composition 20 to from the film.

Referring to FIGS. 1 to 4, a method for forming a film on a workpiece 30 includes the following steps.

At block 12, provide a mold 10 as shown in FIG. 1.

At block 14, inject the liquid composition 20 in the cavity 1113 of the bottom mold 111. The liquid composition 20 sinks to a bottom of the cavity 1113.

At block 16, place the workpiece 30 in the cavity of the bottom mold 111, and match the top mold 112 with the bottom mold 111 with the positioning pillars 1123 inserted in the positioning holes 1114 and the elastic supporting member 115 being elastically pressed by the top mold 112. A gap is formed between the between workpiece 30 and an inner wall of the cavity 1113.

At block 18, place the top mold 112 and the bottom mold 111 in the accommodation member 1131, slidably mount the cover 1132 in the accommodation member 1131, and exhaust air from the case 113 by the air pump 1133. Therefore, the liquid composition 20 flows in the gap formed between the between workpiece 30 and an inner wall of the cavity 1113.

At block 20, solidify the liquid composition 20 by the light emitting from the lighting member 114 to form a film 40 on the workpiece 30.

At block 22, release the workpiece 30 and the film 40 from the cavity 1113.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to, and including, the full extent established by the broad general meaning of the terms used in the claims. It will therefore be appreciated that the embodiments described above may be modified within the scope of the claims.

What is claimed is:

1. A method for forming a film, comprising:
    disposing a liquid composition into a cavity of a transparent bottom mold;
    placing a workpiece in the cavity;
    matching a top mold with the bottom mold to accommodate the workpiece between the bottom mold and the top mold; the top mold comprises a top wall, a bottom wall, and a side wall connected between the top wall and the bottom wall, the bottom wall faces to the bottom mold; an air hole is defined in the top mold and extended from the side wall to the bottom wall;
    receiving the bottom mold and the top mold placed in a case and exhausting air from the case to coat the plurality of liquid composition on the workpiece; and
    solidifying the liquid composition to form a film on the workpiece by emitting light from a lighting member on the liquid composition.

2. The method of claim 1, wherein a release layer is formed on an inner wall of the cavity.

3. The method of claim 1, wherein the bottom mold comprises a top surface facing to the top mold, the top surface defines a positioning hole, and the top mold comprises a positioning pillar which is positioned in the positioning hole.

4. The method of claim 1, wherein an elastic supporting member is elastically sandwiched between the bottom mold and the top mold.

5. The method of claim 4, wherein bottom mold comprises a top surface facing to the top mold, the top surface defines a receiving hole, and the elastic supporting member is placed in the receiving hole.

6. The method of claim 1, wherein a gap is defined between the workpiece and an inner wall of the cavity, and the air hole is aligned to the gap.

7. The method of claim 1, wherein the case comprises a cover slidably mounted in the case and sealed with an inner side of the case.

* * * * *